United States Patent [19]

Ohte et al.

[11] 4,099,413
[45] Jul. 11, 1978

[54] THERMAL NOISE THERMOMETER

[75] Inventors: Akira Ohte; Makoto Imamura, both of Musashino, Japan

[73] Assignee: Yokogawa Electric Works, Ltd., Tokyo, Japan

[21] Appl. No.: 805,729

[22] Filed: Jun. 13, 1977

[30] Foreign Application Priority Data

Jun. 25, 1976 [JP] Japan .................................... 51-75223
Jun. 25, 1976 [JP] Japan .................................... 51-75225

[51] Int. Cl.$^2$ .............................................. G01K 7/30
[52] U.S. Cl. ............................... 73/359 R; 73/362 AR
[58] Field of Search ........................... 73/362 AR, 359; 324/65 R, 71 R

[56] References Cited

U.S. PATENT DOCUMENTS

| | | | |
|---|---|---|---|
| 2,884,786 | 5/1959 | Burk et al. ............................. | 73/359 |
| 3,818,761 | 6/1974 | Brixy et al. ............................ | 73/359 |
| 3,878,723 | 4/1975 | Blalock et al. ......................... | 73/359 |

Primary Examiner—James J. Gill
Attorney, Agent, or Firm—Parmelee, Johnson, Bollinger & Bramblett

[57] ABSTRACT

A thermal noise thermometer operating on the principle that the temperature of a resistor is related to the magnitude of the thermal noise signal produced in the resistor. The thermoseter comprises a temperature-sensing resistor, a shot noise source, means for selectively applying shot noise signals from the shot noise source to the resistor, a DC amplifier for amplifying the DC signal produced in the resistor, an AC amplifier for amplifying the AC signal produced in the resistor, and means for calculating the temperature to be measured from the output signal of the AC amplifier produced when the shot noise signal is applied to the resistor, the output signal of the AC amplifier produced when no shot noise signal is applied to the resistor, and the output signal of the DC amplifier.

10 Claims, 9 Drawing Figures

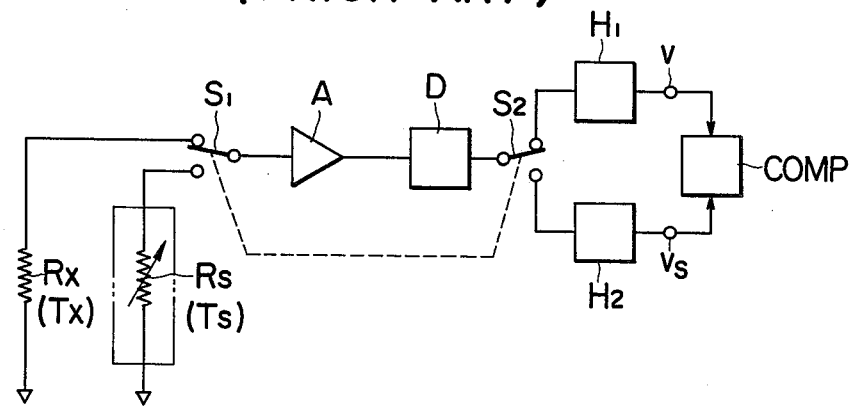
FIG. 1 (PRIOR ART)
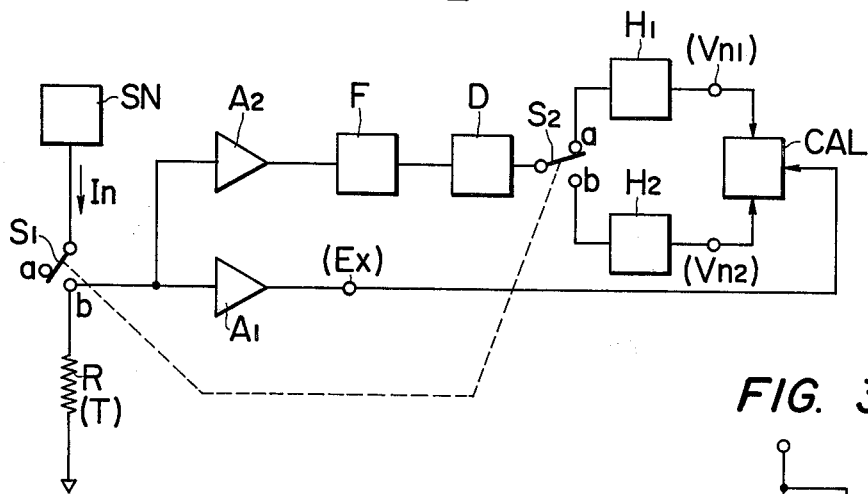
FIG. 2
FIG. 3
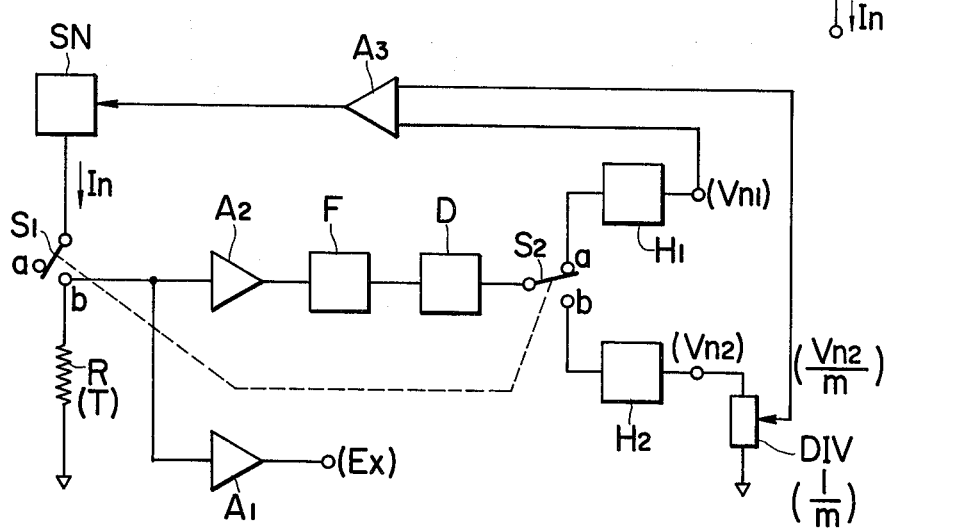
FIG. 4

THERMAL NOISE THERMOMETER

BACKGROUND OF THE INVENTION

1. Field of the Invention

This invention relates to a thermal noise thermometer operating on the principle that the temperature of a resistor is related to the magnitude of the thermal noise signal (voltage, current, or power) produced in the resistor.

It is known in the art that a resistor at a temperature Tx produces a thermal noise signal caused by electron thermal motion. The effective value of this noise signal is expressed by the equation:

$$V = \sqrt{4K \cdot Tx \cdot Rx \cdot B} \qquad (1)$$

where K is Boltzmann's constant, Rx is the resistance of the resistor, and B is the frequency bandwidth of the thermal noise signal.

The present invention makes use of the relationship expressed by equation 1.

2. Description of the Prior Art

FIG. 1 is a block diagram of a conventional thermal noise thermometer in which the reference character Rx identifies a temperature detecting resistor placed at a temperature Tx to be measured, the reference character Rs identifies a standard resistor placed at a standard temperature Ts, the reference character A identifies an AC amplifier for amplifying thermal noise signals applied thereto through a switch S1, the reference character D identifies a rectifier for rectifying the output of the AC amplifier A, the reference characters H1 and H2 identify first and second hold circuits for holding signals fed thereto from the rectifier D through a switch S2 associated with the switch S1, and the reference legend COMP identifies a comparator for comparing the outputs of the first and second hold circuits H1 and H2.

The operation of the switches S1 and S2 in synchronism causes the comparator COMP to compare the magnitudes of the thermal noise signal V produced in the resistor R and the thermal noise signal Vs produced in the standard resistor Rs. Thus, while the switches S1 and S2 are operating, the operator can adjust the resistance of the resistor Rs such to equate the magnitudes of the thermal noise signals V and Vs. When the thermal noise signals V and Vs are equal in magnitude:

$$V = \sqrt{4K \cdot Tx \cdot Rx \cdot B} = Vs = \sqrt{4K \cdot Ts \cdot Rs \cdot B} \qquad (2)$$

The equation for the temperature Tx then can be written as:

$$Tx = Rs/Rx \cdot Ts \qquad (3)$$

Thus, the temperature T can be calculated from the value of the resistance of the standard resistor Rs, the value of the resistance of the resistor Rx, and the value of the standard temperature Ts.

However, measurement of temperature by use of the above-described conventional method requires maintenance of the standard resistor at a standard temperature, for example, by placing the standard resistor in a thermostatically-controlled enclosure. This method also requires measurement of the value of the resistance of the resistor Rx.

SUMMARY OF THE INVENTION

An object of the present invention is to provide an improved thermal noise thermometer which will be free from the disadvantages associated with the conventional thermal noise thermometers. In accordance with a principal aspect of the present invention, it is possible to eliminate the need for thermostat control and measurement of the resistor resistance, thus, providing a simple structure for easily measuring temperature.

Another object of the present invention is to provide an improved thermal noise thermometer which is independent of noises produced in the thermometer components to provide an accurate temperature measurement.

Other objects and advantages of the present invention will become apparent upon reading the following detailed description with reference to the following drawings.

BRIEF DESCRIPTION OF THE DRAWINGS

FIG. 1 is a block diagram showing a conventional thermal noise thermometer;

FIG. 2 is a block diagram showing one embodiment of a thermal noise thermometer according to the present invention;

FIG. 3 shows a circuit of the shot noise source included in the thermal noise thermometer of the present invention;

FIGS. 4 through 7 are block diagrams showing other embodiments of the thermal noise thermometer according to the present invention.

DESCRIPTION OF THE PREFERRED EMBODIMENTS

Figure 5:
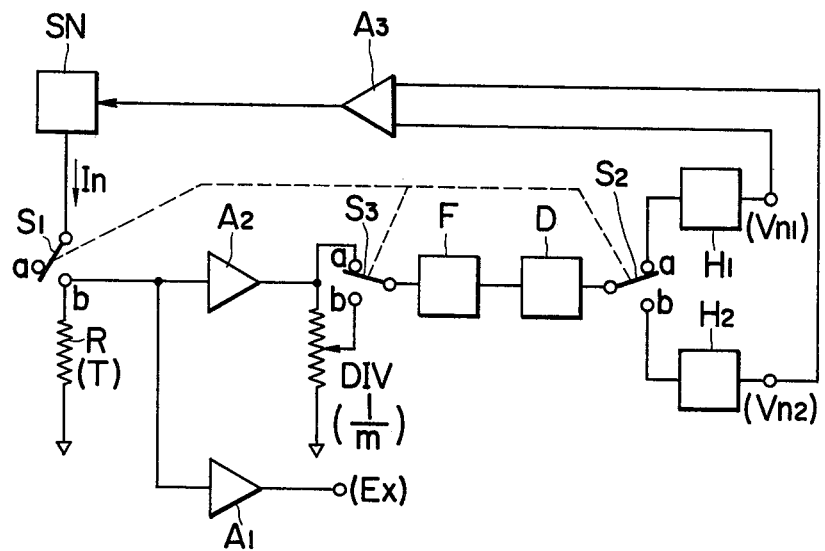

FIG. 2 illustrates one embodiment of a thermal noise thermometer according to the present invention, in which the reference character R identifies a temperature detecting resistor placed at a temperature T to be measured and the reference character SN identifies a shot noise source comprised of a device having a saturated diode characteristic. (The shot noise source SN can be replaced by an equivalent circuit as shown in FIG. 3 in which a DC current source Io is connected in parallel with a noise current source Ino.) The effective value In(rms) of the noise output current In is:

$$In(rms) = \sqrt{2q \cdot Io \cdot B} \qquad (4)$$

where q represents the charge of an electron.

The reference character S1 identifies a switch having contacts a and b for selectively coupling the noise output current In to the resistor R, the reference character A1 identifies a DC amplifier for amplifying the DC signals produced in the resistor R, the reference character A2 identifies an AC amplifier for amplifying the AC signals produced in the resistor R, the reference character F identifies a band-pass filter connected to the output of the AC amplifier A2, the reference character D identifies a rectifier comprised of a square-law detector or a linear detector for rectifying the output signals of the band-pass filter F, the reference character S2 identifies a switch having contacts a and b and drivingly connected to the switch S1 for synchronous operation, the reference characters H1 and H2 identifies first and second hold circuits for holding the signals applied thereto from the rectifier D through the switch S2, and the reference character CAL identifies a calculator circuit connected to the output of the DC amplifier A1.

The operation of the thermal noise thermometer of the present invention is as follows: When the drivingly-connected switches S1 and S2 are placed in the position a to disconnect the shot noise source SN from the temperature detecting resistor R and also to connect the output of the rectifier D to the first hold circuit H1, the thermal noise signal produced in the resistor R is fed through the AC amplifier A2 to the band-pass filter F and hence is fed through the rectifier D to the first hold circuit H1 where the signal is stored. Assuming that the rectifier D comprises a linear detector, the output voltage Vn1 of the first hold circuit H1 is expressed by the equation:

$$Vn1 = \sqrt{4K \cdot T \cdot R \cdot B \cdot G} \qquad (5)$$

where G is the gain of the AC amplifier A2.

The output voltage of the DC amplifier A1 is zero since the thermal noise signal includes no direct current component.

When the switches S1 and S2 are placed in the position b to connect the shot noise source SN to the resistor R and also to connect the output of the rectifier D to the second hold circuit H2, the thermal noise signal produced in the resistor R and the shot noise signal are fed through the AC amplifier A2 to the band-pass filter F and hence through the rectifier D to the second hold circuit H2 where the signals are stored. The output voltage Vn2 of the second hold circuit H2 is expressed by the equation:

$$Vn2 = \sqrt{4K \cdot T \cdot R \cdot B + 2q \cdot Io \cdot R^2 \cdot B} \times G \qquad (6)$$

The DC amplifier A1 serves to amplify the DC voltages appearing across the resistor R. Assuming that the gain of the DC amplifier A1 is unity, the output voltage of the DC amplifier A1 can be expressed by the equation:

$$Ex = Io \cdot R \qquad (7)$$

From equations 5 and 6, the ratio $m \ (= Vn2/Vn1)$ of the output voltage Vn2 of the second hold circuit H2 and the output voltage Vn1 of the first hold circuit H1 can be expressed by the equation:

$$m = \frac{Vn2}{Vn1} = \frac{\sqrt{4K \cdot T \cdot R \cdot B + 2q \cdot Io \cdot R^2 \cdot B} \times G}{\sqrt{4K \cdot T \cdot R \cdot B} \times G} \qquad (8)$$

$$= \sqrt{1 + \frac{q \cdot Io \cdot R}{2K \cdot T}}$$

Substituting equation 7 into equation 8, $$M = \sqrt{1 + \frac{q \cdot Ex}{2K \cdot T}} \qquad (9)$$

Solving this equation 9 for the temperature T, we obtain:

$$T = q/2K \cdot Ex/m^2 - 1 \qquad (10)$$

The output voltages Vn1 and Vn2 of the first and second hold circuit H1 and H2 and the output voltage Ex of the DC amplifier A1 are applied to the calculating circuit CAL in which, utilizing well known calculating techniques, the value of temperature T is calculated according to the relationship expressed by equation 10.

If the rectifier D comprises a square-law detector circuit in this embodiment, the output voltages Vn1 and Vn2 of the first and second hold circuits H1 and H2 and the temperature T can be expressed by the equations:

$$Vn1 = 4K \cdot T \cdot R \cdot B \cdot G^2 \qquad (11)$$

$$Vn2 = 4K \cdot T \cdot R \cdot B \cdot G^2 + 2q \cdot Io \cdot R^2 \cdot B \cdot G^2 \qquad (12)$$

$$T = (q/2K) \cdot (Ex/m - 1) \qquad (13)$$

where $m = Vn2/Vn1 = 1 + (q \cdot Io \cdot R/2K \cdot T)$

The thermal noise thermometer of the present invention measures temperature based on the values of the thermal noise signal Vn1 produced in the resistor R, the thermal noise signal Vn2 produced in the resistor R coupled to the shot noise, and the output voltage Ex of the DC amplifier A1 when the shot noise is applied to the resistor R. Thus, such apparatus in accordance with the present invention eliminates the need for maintaining the temperature of a standard resistor at standard temperature by placing the resistor in a thermostatically-controlled region and measuring the resistance of the resistor, as in the conventional thermal noise thermometers. The thermal noise thermometer provided in accordance with the present invention is simple in structure and easy to operate.

FIG. 4 shows a block diagram of another embodiment of the present invention. The main difference between this embodiment and the first embodiment is that a resistive divider D is provided for dividing the output voltage Vn2 of the second hold circuit H2 to Vn2/m. A differential amplifier A3 also is provided having its inputs connected to the output voltage Vn1 of the first hold circuit H1 and connected to the divided output voltage Vn2/m of the second hold circuit H2 to control the magnitude of the output signal from the shot noise source SN is such a manner as to equalize the voltages Vn1 and Vn2/m which are applied to the inputs of the differential amplifier A3. Assuming that the rectifier D comprises a linear detector circuit, the following equation is obtained:

$$Vn1 = \sqrt{4K \cdot T \cdot R \cdot B \cdot G} = \frac{Vn2}{m} \qquad (14)$$

$$= \frac{1}{m} \sqrt{4K \cdot T \cdot R \cdot B \cdot G + 2q \cdot Io \cdot R^2 \cdot B \cdot G}$$

This equation can be written as:

$$(m^2 - 1) \cdot 2K \cdot T = q \cdot Io \cdot R \qquad (15)$$

Solving equation 15 for the value of T:

$$T = q/2K \cdot (Ex/m^2 - 1) \qquad (16)$$

where $Ex = Io \cdot R$

In equation 16, the dividing ratio $m$ and the value $2K/q \ (-172.5 \ \mu V/K)$ are constant and thus the output voltage Ex of the AC amplifier A1 corresponds to the temperature T to be measured.

Where the rectifier D comprises a square-law detector circuit in this embodiment, equations 14, 15 and 16 can be respectively expressed by $$Vn1 = 4K \cdot T \cdot R \cdot B \cdot G = \frac{Vn2}{M} \quad (17)$$
$$= \frac{1}{m}(4K \cdot T \cdot R \cdot B \cdot G + 2q \cdot Io \cdot R^2 \cdot B \cdot G)$$

$$(m - 1) \cdot 2K \cdot T = q \cdot Io \cdot R \quad (18)$$

$$T = q/2K \cdot Ex/m = 1 \quad (19)$$

FIG. 5 illustrates a third embodiment of a thermal noise thermometer in accordance with the present invention. In this embodiment, a resistive divider DIV and a switch S3 are interposed between the amplifier A2 and the band-pass filter F. The divider DIV serves to divide the output voltage of the amplifier A2 at a dividing ratio m, and the switch S3 is synchronized with the switches S1 and S2 for connecting the output of the amplifier A2 directly to the band-pass filter F or for connecting the same through the divider DIV to the band-pass filter F. In this embodiment errors due to the non-linearity found in the band-pass filter F and the rectifier D can be offset by the function of the differential amplifier A and any error is not reflected in the output voltage Ex of the DC amplifier A1.

Figure 6:
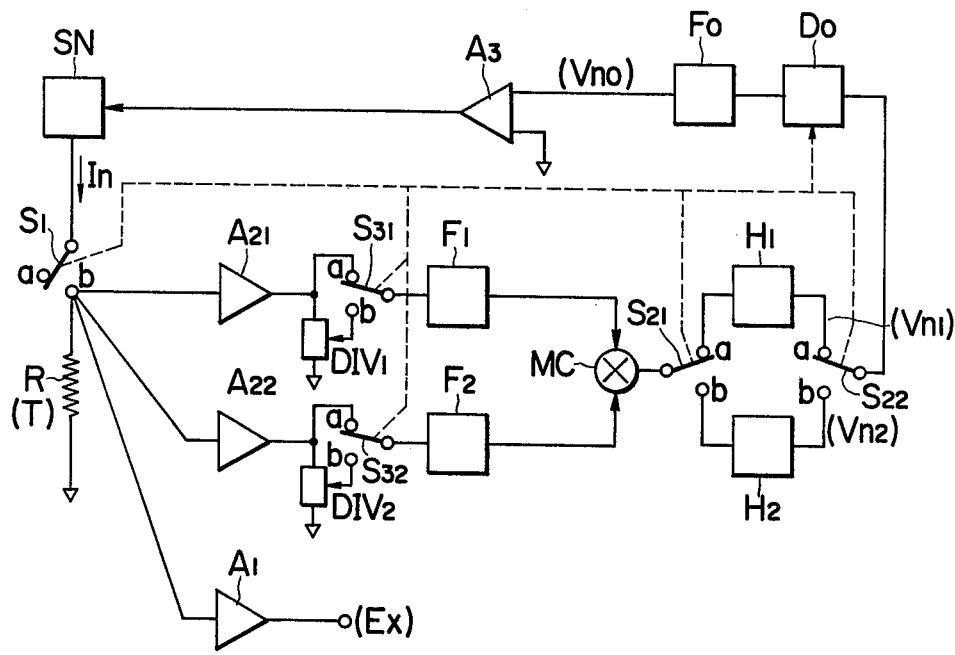

FIG. 6 shows in block diagram a fourth embodiment of a thermal noise thermometer in accordance with the present invention. This embodiment includes two identical circuits each comprising an amplifier A21 or A22, a divider DIV1 or DIV2, and a band-pass filter F1 or F2. The outputs of these circuits are coupled to a multiplier MC to eliminate noises produced in the amplifiers A21 and A22, the switches S31 and S32, and the band-pass filters F1 and F2. When the respective switches S1 through S32 are placed in the position a, the output voltage Vn1 of the first hold circuit H1 is expressed as:

$$Vn1 = (Vth + lnA1)G1 \cdot (Vth + lnA2)G2 \quad (20)$$
$$= Vth^2 + Vth(lnA1 + lnA2) + lnA1 \cdot lnA2 \cdot G1 \cdot G2$$

where the Vth is the thermal noise signal magnitude produced in the resistor R, lnA1 is the total noise produced in the amplifier A21, the switch S31, and the band-pass filter F1, lnA2 is the total noise produced in the amplifier A22, the switch S32, and the band-pass filter F2, G1 is the gain of the amplifier A21, and G2 is the gain of the amplifier A22. There is no inter-relation between the values Vth and (lnA1 + lnA2) and between the values lnA1 and lnA2 and thus, the average value $\overline{Vn1}$ of the output voltage Vn1 of the hold circuit H1 is expressed as:

$$\overline{Vn1} = \overline{Vth^2} \cdot G1 \cdot G2 \quad (21)$$
$$= 4K \cdot T \cdot R \cdot B \cdot G1 \cdot G2$$

This relationship is also true in the case where the switches S1 through S32 are placed in the position b. Thus, this embodiment maintains the thermal noise thermometer free from noises produced in the amplifiers, the switches, and the band-pass filters. This method can also be used in conjunction with the thermal noise thermometer in accordance with the first embodiment shown in FIG. 2.

Figure 7:
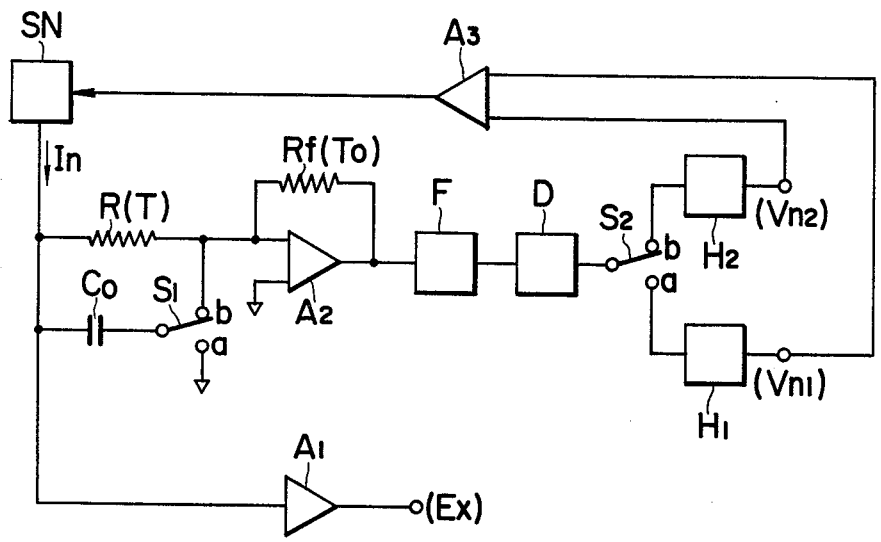

FIG. 7 shows a block diagram of a fifth embodiment of a thermal noise thermometer according to the present invention in which the reference character Co identifies a capacitor, the reference character S1 identifies a switch having contacts a and b for connecting one end of the resistor R and the shot noise source SN through the capacitor Co (when placed in the position a) or shorting the resistor R through the capacitor Co (when placed in the position b), the reference character A1 identifies a DC amplifier for amplifying the DC signal appearing in the capacitor Co (or the Dc voltage produced across the resistor R), the reference character A2 identifies an amplifier having a feed-back resistor Rf for amplifying the AC signals produced in the resistor R and for maintaining the junction of the resistors R and Rf at zero potential, the reference character F identifies a band-pass filter whose input is connected to the output of the amplifier A2, the reference character D identifies a rectifier for rectifying the output signal of the band-pass filter F comprised of a square-law detector or a linear detector, the reference character S2 identifies a switch having contacts a and b and drivingly connected with the switch S1, the reference characters H1 and H2 identify first and second hold circuits for holding the signals fed from the rectifier D through the switch S2 each comprised of a capacitor, the reference character A3 identifies a differential amplifier the inputs of which are connected to the output voltage Vn1 of the first hold circuit H1 and to the output voltage Vn2 of the second hold circuit H2 for controlling the shot noise source SN in such a manner as to equalize the output voltages Vn1 and Vn2 of the first and second hold circuits H1 and H2.

When the switches S1 and S2 are placed in the position a, the noise output signal In from the shot noise source SN is connected through the capacitor Co to the ground and the other end of the resistor R is connected through the capacitor Co to the ground. The capacitor Co is such that the value 1/Co R is significantly smaller than the lower limit frequency of the band-pass filter F. The effective value If of the noise current flowing through the feed-back resistor Rf is equivalent to the value when the resistor R is shorted and thus, the effective value If is expressed by the equation:

$$If = \sqrt{4K \cdot T \cdot R \cdot B/R} \quad (22)$$

In the case where the rectifier D comprises a square-law detector circuit, the output voltage Vn1 of the first hold circuit H1 is expressed by the equation:

$$Vn1 = (4K \cdot T \cdot R/(R^2)) \cdot Rf^2 + 4K \cdot To \cdot Rf)B \cdot G^2 \quad (23)$$

where G is the total gain of the filter F, the rectifier D, and the first hold circuit H1, and the value $4K \cdot To \cdot Rf \cdot B$ is the thermal noise signal.

When the switches S1 and S2 are placed in the position b, the thermal noise signal produced in the resistor R is shorted through the capacitor Co, whereas the noise output current In from the shot noise source is connected through the resistor R to the input of the amplifier A2. Thus, the output voltage Vn2 of the second hold circuit H2 can be expressed by the equation:

$$Vn2 = (2q \cdot Io \cdot Rf^2 + 4K \cdot To \cdot Rf)B \cdot G^2 \quad (24)$$

The DC amplifier A1 functions to amplify the voltage across the capacitor Co. The capacitor has one end connected to the switch S1 and held at zero potential regardless of what position the switch S1 is placed in. Thus, assuming that the gain of the amplifier A1 is unity, the output voltage Ex of the amplifier A1 can be expressed by the equation:

$$Ex = Io \cdot R \tag{25}$$

The differential amplifier A3 has its inputs connected to the output voltages Vn1 and Vn2 of the first and second hold circuits H1 and H2 which voltages can be respectively expressed by equations 23 and 24. The differential amplifier A3 functions to control the magnitude of the shot noise current In in such a manner as to equalize the output voltages Vn1 and Vn2 of the first and second hold circuits H1 and H2. When the output voltages Vn1 and Vn2 are equal:

$$\frac{4K \cdot T \cdot R}{R^2} Rf^2 + 4K \cdot To \cdot Rf)B \cdot G^2 \tag{26}$$
$$= (2q \cdot Io \cdot Rf^2 + 4K \cdot To \cdot Rf)B \cdot G^2$$

This equation can be written as:

$$4K \cdot T/R = 2q \cdot Io \tag{27}$$

Substituting equation 25 into equation 27, the equation for the temperature T is:

$$T = (q/2K) \cdot Ex \tag{28}$$

In equation 28, the value $q/2K$ is constant and thus the temperature T to be measured corresponds to the output voltage Ex of the Dc amplifier.

Figure 8:
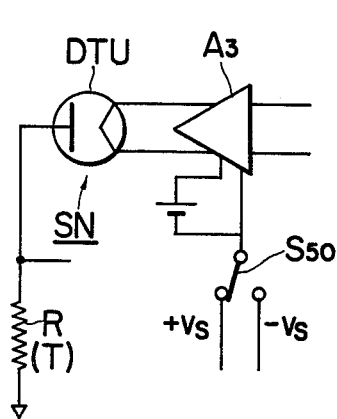
FIGS. 8 and 9 are block diagrams showing shot noise sources used in the thermal noise thermometer according to the present invention.
Figure 9:
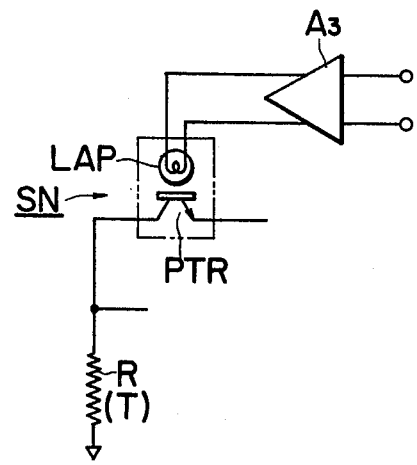

FIGS. 8 and 9 show examples of the shot noise sources applicable to the thermal noise thermometer according to the present invention. The shot noise source SN shown in FIG. 8 includes a diode tube DTU whose heater current is controlled by the output signal of the differential amplifier and a switch 50 for alternatively connecting one of the power terminals of the differential amplifier A3 to voltages +Vs and −Vs. The switch 50 functions as the switch S1 used in the embodiments shown in FIGS. 2 through 6.

The shot noise source shown in FIG. 9 includes a photo-transistor PTR, a lamp facing the photo-transistor PTR in which the amount of light is controlled by the output signal of the differential amplifier A3, and a lighttight box containing the photo-transistor PTR and the lamp.

In addition, a photo-diode or a photoelectric tube may be used in the shot noise source, in which case, the magnitude of the output of the shot noise source is controlled by varying the amount of the light projected onto the device. Also, the reverse current of a diode may be utilized, in which case, the output of the shot noise source is controlled by varying the temperature of the diode.

It is, therefore, apparent that there has been provided, in accordance with the present invention, an improved thermal noise thermometer for facilitating the accurate measurement of temperature without troublesome operations. While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

We claim:

1. A thermal noise thermometer based on the principle that the magnitude of thermal noise signal produced in the resistor is a function of the temperature of the resistor, comprising:
   means to develop a shot noise signal;
   switch means to interruptedly apply said shot noise signal to said resistor;
   voltage-responsive means coupled to said resistor for producing output signals responsive to the voltage thereof in the different conditions of said switch means; and
   means coupled to the output of said voltage-responsive means for producing a measurement signal representing the temperature of said resistor.

2. A thermometer as claimed in claim 1, wherein said voltage-responsive means includes means to develop a DC output signal derived from the DC component of the shot noise signal applied to the resistor.

3. A thermometer as claimed in claim 2, wherein said voltage-responsive means includes:
   means to produce a first-signal corresponding to the resistor thermal noise signal, a second signal corresponding to the combination of the thermal noise signal and the shot noise signal applied to the resistor; and
   means to cause said first and second signals to bear a constant relationship, whereby said DC signal provides a measure of the temperature.

4. A thermal noise thermometer as claimed in claim 1, including:
   means for shorting the resistor; and
   means for controlling the shot noise signal source to provide that the shot noise signal is equal to the thermal noise current flowing through the resistor when it is shorted, whereby the temperature of the resistor is indicated by the DC voltage produced in the resistor.

5. A thermal noise thermometer as claimed in claim 1, wherein the effective value of the shot noise applied to the resistor is expressed by $$In \text{ (rms)} = 2q \cdot Io \cdot B$$

where $q$ is the charge of an electron, Io is the magnitude of the DC current, and B is the frequency bandwidth of the noise.

6. A thermal noise thermometer as claimed in claim 1, including a first circuit for amplifying the thermal noise signal produced in the resistor and a second circuit for amplifying the noise signal produced in said resistor when connected to the shot noise, and means for interrelating the output signals of said first and second circuit.

7. A thermal noise thermometer as claimed in claim 1, wherein the shot noise source comprises a diode tube.

8. A thermal noise thermometer as claimed in claim 1, wherein the shot noise source comprises a photoelectric tube.

9. A thermal noise thermometer as claimed in claim 1, wherein the shot noise source comprises a photo-transistor.

10. A thermal noise thermometer as claimed in claim 1, wherein the reverse current of a diode is utilized as a shot noise source.

* * * * *